Aug. 19, 1941.
G. A. GILLEN
2,252,887
ELECTRICAL MACHINE
Filed Oct. 2, 1937
3 Sheets-Sheet 1
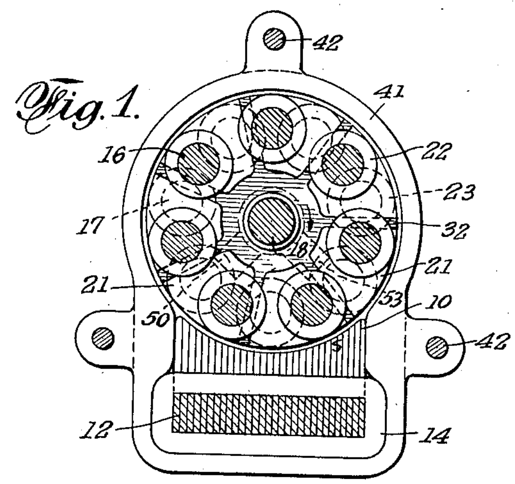
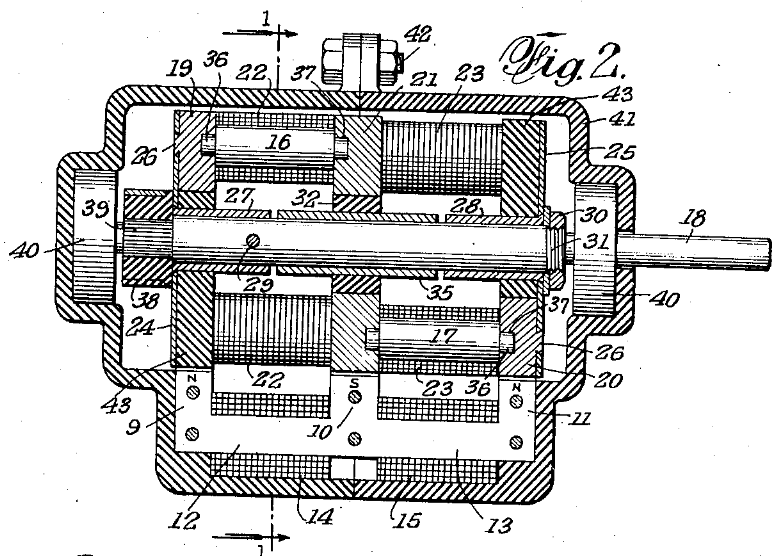
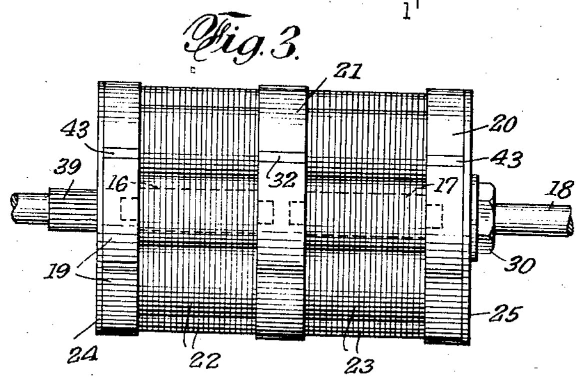
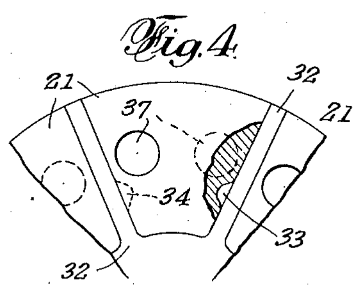
GEORGE A. GILLEN
INVENTOR
BY Philip S. McLean
ATTORNEY Aug. 19, 1941. G. A. GILLEN 2,252,887
ELECTRICAL MACHINE
Filed Oct. 2, 1937 3 Sheets-Sheet 2
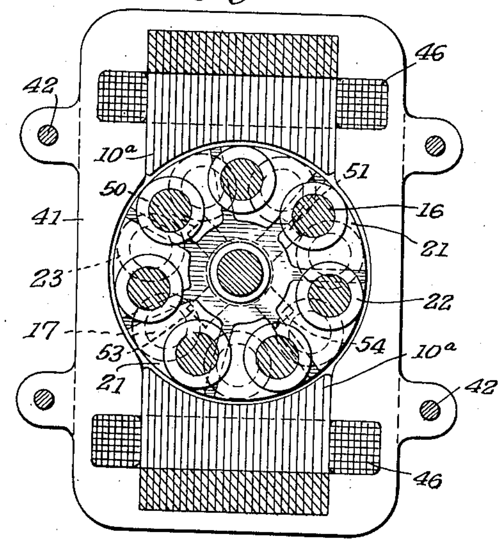
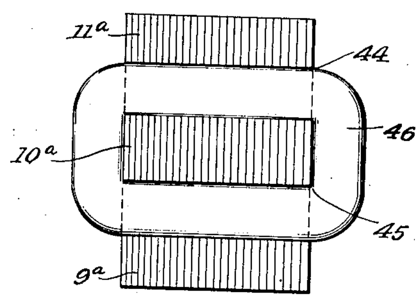
GEORGE A. GILLEN
INVENTOR
BY Philip S. McLean.
ATTORNEY Aug. 19, 1941.  G. A. GILLEN  2,252,887
ELECTRICAL MACHINE
Filed Oct. 2, 1937  3 Sheets-Sheet 3
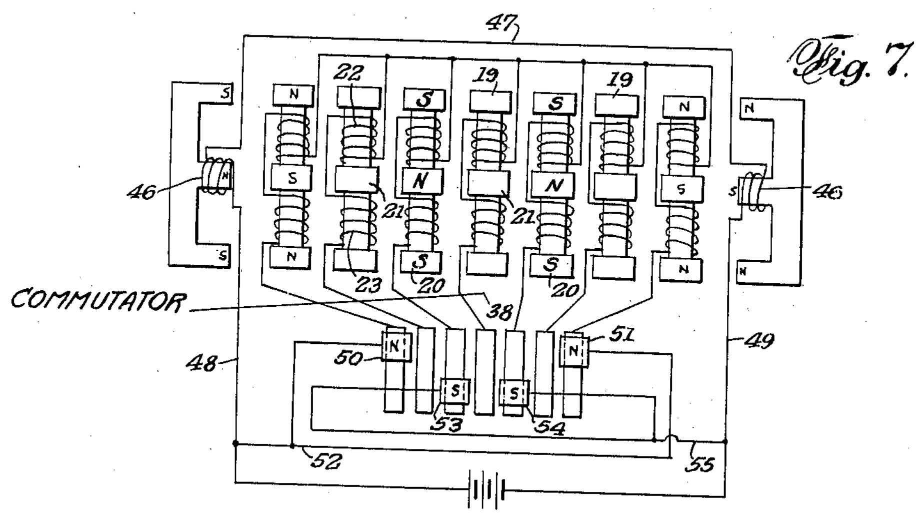
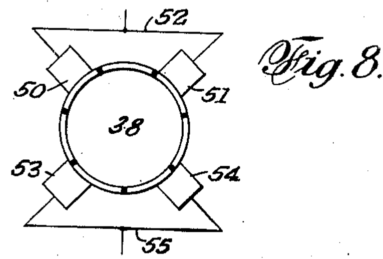
GEORGE A. GILLEN
INVENTOR
BY Philip S. McLean
ATTORNEY Patented Aug. 19, 1941

2,252,887

UNITED STATES PATENT OFFICE 2,252,887

ELECTRICAL MACHINE

George A. Gillen, Bronx, N. Y.

Application October 2, 1937, Serial No. 166,923

3 Claims. (Cl. 172—36)

The invention herein disclosed relates to electrical machines, particularly in the nature of motors and generators.

Objects of the invention are to provide a practical commercial design of simple, readily manufactured and easily assembled parts, having the advantages of smooth, quiet running and good torque characteristics.

Other objects and the novel features of construction, combinations and relations of parts constituting the invention are set forth and will appear in the course of the following specification.

The drawings accompanying and forming part of the specification illustrate several possible forms of the invention, but it should be understood that the structure may be modified and changed in various ways from these particular disclosures, all within the true intent and broad scope of the invention as hereinafter defined and claimed.

Fig. 1 is a vertical sectional view of a machine embodying one form of the invention, this view appearing substantially as on the section line 1—1 of Fig. 2.

Fig. 2 is a vertical sectional view of the machine, substantially on a plane at right angles to the plane of Fig. 1.

Fig. 3 is a broken detail view of the armature illustrating however a modification in the relation of the polar segments, distinct from the showing in Figs. 1 and 2.

Fig. 4 is a broken part sectional view illustrating the interlocking mounting of the intermediate pole segments in the molded support for the same.

Fig. 5 is a transverse vertical sectional view similar to Fig. 1, illustrating a modification with a double in place of a single field structure.

Fig. 6 is a plan or face view of one of the field magnets used in the latter construction.

Figs. 7 and 8 are wiring diagrams.

In the single field form of the invention illustrated in Figs. 1 and 2, there is a single field magnet consisting of three pole pieces 9, 10, 11, connected by limbs or cores 12, 13, carrying windings 14, 15, for forming two like end poles at 9, 11, and an unlike intermediate pole at 10.

The armature is shown as made up of two sets of magnet cores 16, 17, in tandem or end-to-end relation longitudinally of and substantially parallel with the shaft 18, magnetically connected with end pole segments 19, 20, and intermediate pole segments 21, common to the cores at opposite sides of the same.

Windings 22, 23, about the cores 16, 17, polarize the end segments 19, 20, alike and the intermediate segment unlike.

The end pole segments are shown as fixed on the inner faces of supporting flanges 24, 25, as by integral rivets 26, and these supporting flanges are indicated as mounted on or as forming parts of the sleeves or bushings 27, 28. The first of such bushings is shown as fixed on the shaft as by cross pin 29, and the other is indicated as forced toward the first by nut 30, engaged over a screw-threaded portion 31, of the shaft.

The intermediate pole segments 21 are shown as carried by a supporting disc 32, indicated as of plastic insulating material, but which may be die cast nonmagnetic metal interlocked with the segments by projecting portions 33, entering corresponding recesses 34, in opposing portions of adjoining segments. This molded support is shown as carried by a sleeve or bushing 35, which may simply have a firm fit on the shaft, being held in position between the two end supporting flanges.

The cores of the armature magnets are shown as having reduced end extensions 36, closely fitting in the corresponding seats 37, in the opposing faces of the polar segments.

This construction permits ready assembly of the parts. The first sleeve 27, with the magnet cores 16 and windings 22, in position thereon may first be located and pinned on the shaft at 29. Then the intermediate pole segments 21, may be slipped over the shaft in position to engage these segments over the ends of the first set of magnet cores 16. After this, the other end sleeve 28, carrying the second set of cores 17, and windings 23, may be passed over the shaft in position to engage the cores 17, with the pole segments 21, and the nut 30, then be applied to lock the structure together.

Either before or after these assembly operations, the commutator indicated at 38, may be fixed in proper position on the shaft as by forcing it over a ribbed or knurled portion 39, on the shaft at the outer side of the first sleeve 27.

The magnet supporting flanges and sleeves may be formed integrally as by constructing them wholly of molded plastic or of non-magnetic metal and if desired, the spaces between the coils may be filled in with plastic or the like, to overcome air drag.

The bearings for the armature shaft, indicated at 40, are shown supported in the casing 41, of the motor and the latter is shown as a two part molded case secured together by fastenings 42, and carrying the field magnet in its proper fixed relation to the armature.

For some purposes, it is found desirable to offset the pole segments at one end of the armature circumferentially from the segments at the opposite end of the armature. This construction is shown in Figs. 1 and 2, where it will be noted that the pole segments 20, cores 17, and windings 23, at one end are offset forwardly in the direction of rotation from the pole segments 19, cores 16 and coils 22, at the opposite end of the armature. In such construction, the sockets 37, for the magnet cores are correspondingly offset in the intermediate pole segments 21, substantially as indicated in Fig. 4.

Fig. 3 shows an armature construction, in which the two sets of magnets at the opposite ends of the armature are directly in line as somewhat simpler and more readily assembled form of construction. The pole segments carried by the end flanges 24, 25, are shown as partly embedded in molded plastic 43, to anchor the segments against any possible shifting on the supporting flanges and from this showing, it will be apparent that such plastic may readily be continued or extended to form the bushing or supporting sleeve and the supporting flange as well.

While two sets of longitudinally extending magnets are shown, it will be appreciated that the armature may be built up with three or more longitudinally arranged sets of magnets, thus providing greater power without increasing the transverse dimensions of the motor.

Instead of the single field structure first disclosed, the double field construction illustrated in Figs. 5 and 6, may be employed. These views also show a modification in the form of the field magnet involving the cross slotting of the field magnet laminations 44, 45, to form the two like end poles 9*a*, 11*a*, and unlike intermediate pole 10*a*. With such construction, a single form wound coil 46, can be used located in the slots 44, 45.

The commutator and brushes are connected and arranged to effect attraction of the approaching pole segments and repulsion of the leaving pole segments at each one of the three poles of the field magnet, or in the case of the double field structure, of both field magnets. Connections for accomplishing this result are indicated diagrammatically in Figs. 7 and 8, where the field coils 46 are shown connected together in series at 47, and with opposite sides of the current source at 48, 49.

Four brushes are indicated in quadrangular relation, one pair 50, 51, being connected together and to one side of the line (48) at 52, and the other pair 53, 54, connected together and to the opposite side of the line (49) at 55.

In the case of a single field construction first illustrated, only one set of brushes is required, located at a substantially 90° angle as indicated at 50, 53, Fig. 1.

Fig. 7 illustrates diagrammatically how the parts may be connected in a double field construction like that shown in Fig. 5 and with the armature magnets arranged in alinement as in Fig. 3. Current from the source flows through lines 48, 49, and the two field coils 46, in series. The brushes 50, 51, connected in parallel and to one side of the line 48, carry current to the armature windings at the extreme left and right in this view to produce like end poles N and unlike intermediate poles S opposed at the left to the oppositely polarized like end field poles S and unlike intermediate field pole N, thus producing attraction at this side while repulsion is effected at the opposite side through the similar polarization of the end and intermediate armature and field poles at the right. The second pair of brushes 53, 54, in the rectangular relation indicated in Fig. 8 and connected with the opposite side of the line 49, provide return paths for the current through armature windings separated from those last described and reversely connected as indicated in Fig. 7, so as to exert repulsion and attraction in the proper direction for rotation of the armature.

What is claimed is:

1. An electric machine, comprising an armature having two sets of electro-magnets provided with magnet cores disposed in end-to-end relation longitudinally of the armature axis, pole segments at the periphery of the armature located at the ends and pole segments intermediate the ends of the armature common to the magnets at opposite sides of the same and a field structure having poles opposite the end and intermediate pole segments of said armature, said intermediate pole segments having sockets in the opposite sides of the same and the cores of magnets at opposite sides of said intermediate segments having extensions to enter said sockets.

2. An electric machine, comprising an armature having two sets of electro-magnets provided with magnet cores disposed in end-to-end relation longitudinally of the armature axis, pole segments at the periphery of the armature located at the ends and pole segments intermediate the ends of the armature common to the magnets at opposite sides of the same and a field structure having poles opposite the end and intermediate pole segments of said armature, said end and intermediate pole segments being carried by tubular supports and the armature including a shaft on which said tubular supports are secured in fixed relation.

3. An electric machine, comprising an armature having two sets of electro-magnets provided with magnet cores disposed in end-to-end relation longitudinally of the armature axis, pole segments at the periphery of the armature located at the ends and pole segments intermediate the ends of the armature common to the magnets at opposite sides of the same and a field structure having poles opposite the end and intermediate pole segments of said armature, said armature magnets including magnet cores at opposite sides of and interlocked with the intermediate pole segments and windings on said cores between the intermediate and end pole segments of the armature.

GEORGE A. GILLEN.